(12) United States Patent
Kircher et al.

(10) Patent No.: US 11,161,431 B2
(45) Date of Patent: Nov. 2, 2021

(54) MANUAL UNLOCKING LEVER FOR SEAT TRACK

(71) Applicant: FAURECIA Sièges d'Automobile, Nanterre (FR)

(72) Inventors: Olivier Kircher, Saint Georges des Groseillers (FR); Patrick Feuillet, Flers (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 16/799,136

(22) Filed: Feb. 24, 2020

(65) Prior Publication Data
US 2020/0269729 A1    Aug. 27, 2020

(30) Foreign Application Priority Data
Feb. 26, 2019   (FR) ...................................... 19 01933

(51) Int. Cl.
*B60N 2/08*    (2006.01)
*B60N 2/07*    (2006.01)

(52) U.S. Cl.
CPC ......... *B60N 2/0843* (2013.01); *B60N 2/0705* (2013.01); *B60N 2/0806* (2013.01)

(58) Field of Classification Search
CPC .. B60N 2/0705; B60N 2/0715; B60N 2/0806; B60N 2/0825; B60N 2/0843
See application file for complete search history.

(56) References Cited

U.S. PATENT DOCUMENTS

| | | | | |
|---|---|---|---|---|
| 6,354,553 B1 * | 3/2002 | Lagerweij | ............ | B60N 2/0715 248/429 |
| 7,661,646 B2 * | 2/2010 | Weber | .................. | B60N 2/0715 248/429 |
| 8,297,582 B2 * | 10/2012 | Kojima | ................ | B60N 2/0881 248/424 |
| 9,033,299 B2 * | 5/2015 | Kramm | ................ | B60N 2/0705 248/429 |
| 9,050,908 B2 * | 6/2015 | Speck | ....................... | B60N 2/08 |
| 10,549,655 B2 * | 2/2020 | Sasaki | .................. | B60N 2/3056 |
| 10,710,475 B2 * | 7/2020 | Jang | ..................... | B60N 2/0875 |
| 2021/0078454 A1 * | 3/2021 | Speck | .................. | B60N 2/0806 |

FOREIGN PATENT DOCUMENTS

| | | |
|---|---|---|
| DE | 102015010017 A1 | 2/2017 |
| FR | 2736311 A1 | 1/1997 |
| FR | 3032657 A1 | 8/2016 |

OTHER PUBLICATIONS

French Search Report for FR 1901933 dated Dec. 23, 2019, 9 pages, no English translation available.

* cited by examiner

*Primary Examiner* — Bradley Duckworth
(74) *Attorney, Agent, or Firm* — Barnes & Thornburg LLP (57) ABSTRACT

A track for a vehicle seat comprising: a lower rail; an upper rail, mounted sliding relative to the lower rail in a longitudinal direction; where a bolt has means of pivoting between a manual lever and an attachment part comprising a first part and a second part belonging respectively to the manual lever and of the attachment part, or vice versa, hinged one relative to the other around said axis of rotation. According to the present disclosure, the first part and the second part comprise means for clipping, mutually engaging, allowing an assembly of the manual lever and the attachment part by elastic deformation of the one at least of the clipping means belonging to the first part and/or to the second part.

8 Claims, 5 Drawing Sheets

MANUAL UNLOCKING LEVER FOR SEAT TRACK

PRIORITY CLAIM

This application claims priority to French Application No. FR 19 01933, filed Feb. 26, 2019, which is expressly incorporated by reference herein.

BACKGROUND

The present disclosure relates to a track, in particular for an automotive vehicle seat. More specifically, the present disclosure relates to a track for vehicle seat comprising a first rail and a second rail mounted sliding relative to each other along a longitudinal direction, and also a bolt comprising a locking member mobile between a locked position, in which the bolt immobilizes the first rail and the second rail relative to each other, and an unlocked position, in which the bolt allows the first rail and the second rail to slide relative to the other. The bolt is intended to be actuated between said locked position and said unlocked position by means of a lever intended to be manually actuated by a user.

SUMMARY

According to the present disclosure, a track for vehicle seat comprising a first rail and a second rail mounted sliding relative to each other along a longitudinal direction, and also a bolt comprising a locking member mobile between a locked position, in which the bolt immobilizes the first rail and the second rail relative to each other, and an unlocked position, in which the bolt allows the first rail and the second rail to slide relative to the other. The bolt is intended to be actuated between said locked position and said unlocked position by means of a lever intended to be manually actuated by a user.

In illustrative embodiments, a track with an unlocking lever that is simpler, quicker to assemble, and a lower unit cost is provided.

In illustrative embodiments, a track for vehicle seat comprising:

a lower rail;

an upper rail, mounted sliding relative to the lower rail in a longitudinal direction;

a bolt comprising a locking member mobile between:

a locked position, in which the bolt immobilizes the lower rail and the upper rail relative to each other;

an unlocked position, in which the bolt allows the lower rail and the upper rail to slide relative to each other.

In illustrative embodiments, the bolt is configured to move from the locked position thereof to the unlocked position thereof by means of a manual control lever, mounted pivoting around a rotation axis on an attachment part, secured to the upper rail or lower rail and the bolt has means of pivoting between said manual lever and the attachment part comprising a first part and a second part belonging respectively to the manual lever and to the attachment part, or vice versa, hinged relative to each other around said axis of rotation.

In illustrative embodiments, the first part and the second part comprise means for clipping, mutually engaging, allowing an assembly of the manual lever and the attachment part by elastic deformation of the one at least of the clipping means belonging to the first part and/or to the second part.

In illustrative embodiments, the characteristics disclosed in the following paragraphs can, optionally, be implemented. They can be implemented independently of each other or in combinations with each other:

the clipping means comprise respectively at least one plug, with a circular cross-section, and at least one circular housing, belonging respectively to the second part and/or to the first part (or vice versa) whose axes are oriented along the axis of rotation, where said plug is received pivoting in said circular housing to form said axis of rotation, the circular housing comprising a discontinuous circular wall with an insertion groove present with a separation of size less than the diameter of the plug, and where the assembly by clipping of the two parts results from insertion of the plug through said insertion groove during which the separation increases by elastic deformation of said circular housing and then returns to the initial value thereof to provide the hold of the plug in the circular wall of the circular housing;

said at least one plug is arranged projecting from a flat surface of an attachment tab, extending in a plane substantially perpendicular to the axis of rotation, and said at least one circular housing is arranged in a flange comprising a flat wall, with at least one flat surface extending in a plane substantially perpendicular to the axis of rotation, where said flat surface engages with said attachment tab in order to provide the translational stop following a direction along the axis of rotation;

said attachment tab is received in an inner chamber formed between said flat wall of the flange, said first flat wall, and a second flat wall, parallel to the flat wall of the flange;

said inner chamber comprises a stop surface engaging with a stop finger laid out on said attachment tab, in order to stop rotation of the manual lever around said axis of rotation relative to the attachment part, according to one rotation direction, when the manual lever is in an end-of-range position relative to the attachment part;

the attachment part is made of metal;

said at least one plug is made as a single unit with the attachment part;

the at least one circular housing is plastic;

the manual lever is made entirely of plastic, said at least one circular housing is laid out as a single piece with the manual lever;

the manual lever is made by injection molding.

In illustrative embodiments, a vehicle seat comprising at least one track according to the present disclosure.

In illustrative embodiments, an assembly method for a track according to the present disclosure, in which said manual lever and said attachment part are assembled by coming to clip the clipping means of the first part and the second part of the means of pivoting of the bolt.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 4b is a left view of the manual lever from FIG. 4a;

FIG. 4c is a perspective view of the manual lever from FIG. 4a;

FIG. 5b is a front view of the hinge part from FIG. 5a.

DETAILED DESCRIPTION

The present disclosure relates to a track 1 for vehicle seat comprising: a lower rail 2; an upper rail 3, mounted sliding relative to the lower rail 2 in a longitudinal direction; a bolt 4 comprising a locking member 41 mobile between: a locked position, in which the bolt 4 immobilizes the lower rail 2 and the upper rail 3 relative to each other; an unlocked position, in which the bolt 4 allows the lower rail 2 and the upper rail 3 to slide relative to each other.

According to the present disclosure, the bolt 4 is configured to pass from the locked position thereof to the unlocked position thereof by means of a manual control lever 5, mounted pivoting around an axis of rotation A5 on an attachment part 6 secured to the lower rail 2 or the upper rail 3.

According to the present disclosure, the bolt 4 has means of pivoting between said manual lever 5 and the attachment part 6 comprising a first part 51 and a second part 61 belonging respectively to the manual lever 5 and of the attachment part 6, or vice versa, hinged one relative to the other around said axis of rotation A5.

According to the present disclosure, the first part 51 and the second part 61 comprise means for clipping, 52, 62, mutually engaging, allowing an assembly of the manual lever 5 and the attachment part 6 by elastic deformation of the one at least of the clipping means belonging to the first part 51 and/or to the second part 61.

Clipping is understood to mean that the attachment of the first part 51 to the second part 61 is provided solely by the shape of the first part 51 which comes to be tightened, at least partially, around the second part 61, in order to prevent the movement of the manual lever 5 relative to the attachment part 6 along a radial direction of the rotation axis A5, and that the placement and withdrawal of the first part 51 on the second part 61 occurs because of the elastic deformation of the first part 51 and/or the second part 61, which is such that it allows the movement of the manual lever 5 relative to the attachment part 6 along said radial direction of the axis rotation A5.

Thus, the assembly, or even disassembly, of the manual lever 5 and the attachment part 6 is done quickly and simply, in that it is not necessary to provide additional elements for providing the translational stop of the manual lever 5 relative to the attachment part 6 along said radial direction of the axis of rotation A5.

This assembly can thus be done by a minimum number of actions by an operator.

Figure 1:
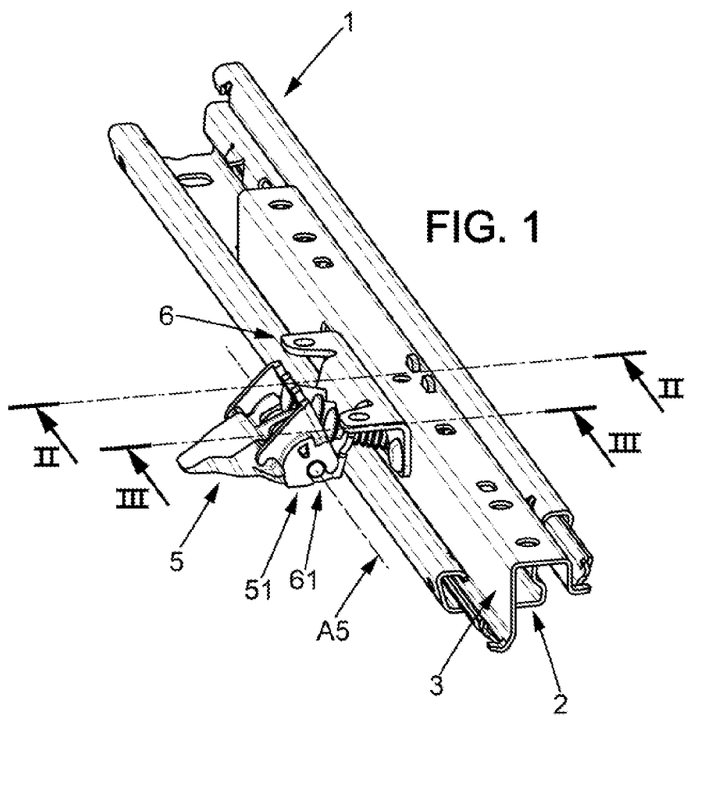
FIG. 1 is a perspective view of a track according to an embodiment in accordance with the present disclosure.
Figure 2:
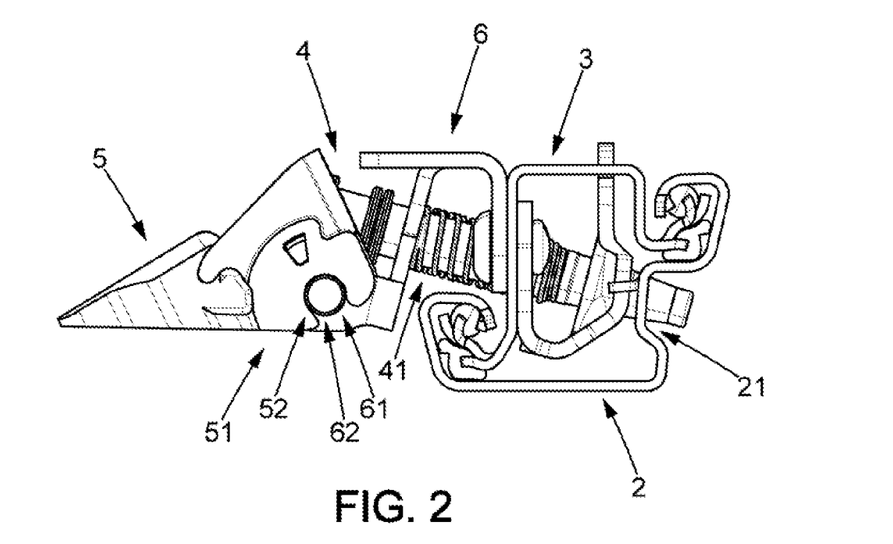
FIG. 2 is a section view along the line II-II of the track from FIG. 1.

As can be seen in the embodiments from FIGS. 1 and 2, the locking member 41 of the bolt 4 can comprise at least one latching plug 41 intended to be received in a latching opening 21 arranged in the lower rail 2 in order to immobilize the lower rail 2 and the upper rail 3 relative to each other, corresponding to said locked position of the locking member 41 of the bolt 4, and in order to be released from said latching opening 21 in order to allow the movement of the lower rail 2 and the upper rail 3 relative to each other, corresponding to said unlocked position of the locking member 41, where the movement of the latching plug 41 is driven by the rotation of the manual lever 5 around the axis of rotation A5.

As can be seen on the embodiment from FIG. 1, said axis of rotation A5 extends preferably along the longitudinal sliding direction of the lower rail 2 relative to the upper rail 3.

According to an embodiment, the clipping means comprise respectively at least one plug 62, with circular section, and at least one circular housing 52, belonging respectively to the second part 61 and the first part 51 (or vice versa), whose axes A52, A62 are oriented along the axis of rotation A5, where said plug 62 is received pivoting in said circular housing 52 in order to form said axis of rotation A5, and where the circular housing 52 comprises a discontinuous circular wall 53 with presence of an insertion groove 54 with the separation e54 of size less than the diameter of the plug 62.

Thus the assembly by clipping of the two parts 51, 61 of the pivoting means of the bolt 4 is obtained by inserting the plug 62 through said insertion groove 54 for which the separation e54 increases by elastic deformation of said circular housing 52 and then returns to the initial value thereof to provide the hold on the plug 62 in the circular wall 53 of the circular housing 52.

In the same way, the disassembly by unclipping of the two parts 51, 61 of the pivoting means of the bolt 4 is obtained by extracting the plug 62 through said insertion groove 54 for which the separation e54 increases by elastic deformation of the circular housing 52 and then returns to the initial value thereof once the manual lever 5 is separated from the attachment part 6.

As can be seen in the sample implementations from FIGS. 1, 2 and 4a to 4c, said circular wall 53 can follow a curve extending between one half and two thirds of a circle.

Said insertion groove can be a straight groove, where the walls are provided tangential to said circular wall 53. The groove can also be provided slightly recessed, across from the circular wall 53, so as to make the insertion or extraction of the plug 62 in the circular housing 52 easier. In other words, the opposite walls of the insertion groove 54 separate along the direction of insertion.

Advantageously, in order to reduce the quantity of material necessary to implement such a track, and to approve its aesthetic appearance, the length L62 of the plug 62 can be substantially equal to the thickness E52 of the circular housing 52.

As can be seen in particular in the embodiment from FIG. 1, in order to get a stiffer pivot link between the manual lever 5 and the attachment part 6, two plugs 62 can be provided on said attachment part 6 engaging with two circular housings 52 of the manual lever 5.

Figure 4A:
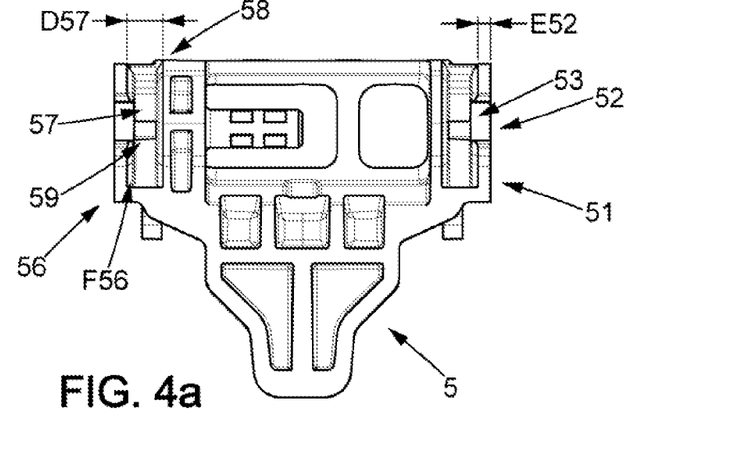
FIG. 4a is a bottom view of the manual lever of the track from FIG. 1.
Figure 4B:
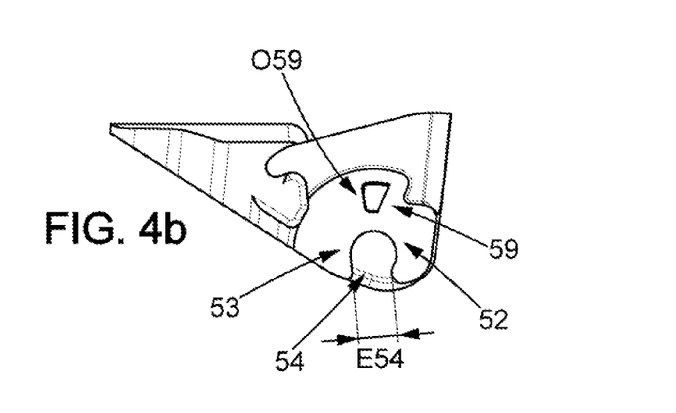
Figure 4C:
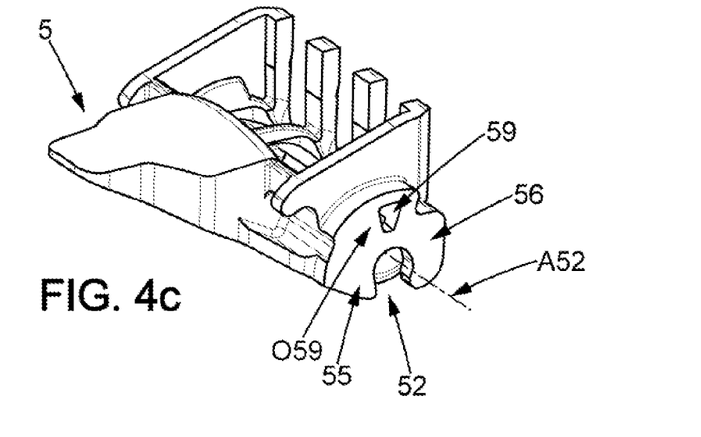
Figure 5A:
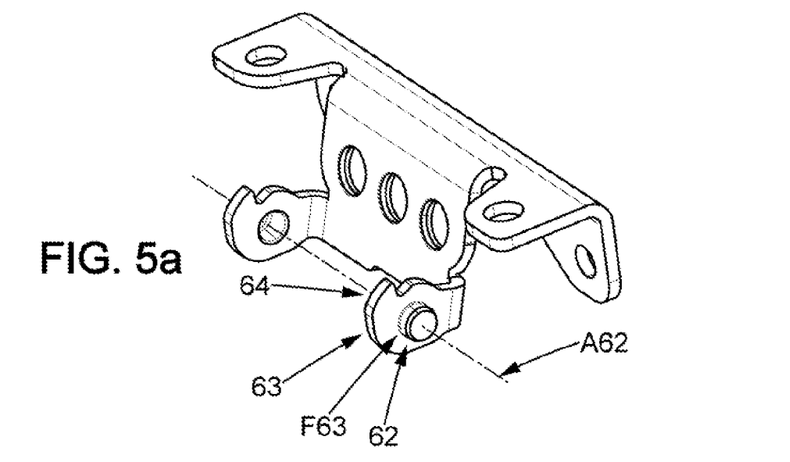
FIG. 5a is a perspective view of the hinge part for the track from FIG. 1.
Figure 5B:
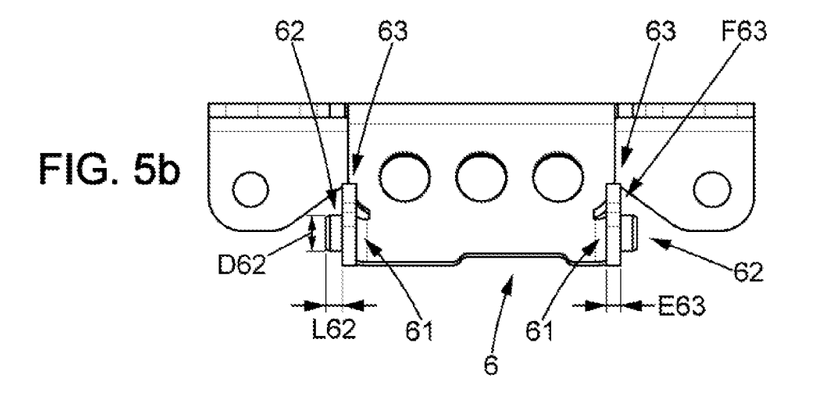

As can be seen in the sample implementation from FIGS. 5a and 5b, the two plugs 62 can be arranged symmetrically about a plane of symmetry of the attachment part 6, orthogonal to the axis of rotation A5, and, as can be seen in the sample embodiment from FIGS. 4a to 4c, the two circular housings 52 can be arranged symmetrically about a plane of symmetry of the manual lever 5, orthogonal to the axis of rotation A5.

According to an embodiment: said at least one plug 62 is arranged projecting from one flat surface F63 of an attachment tab 63 extending in a plane substantially perpendicular to the axis of rotation A5; and said at least one circular housing 52 is arranged in a flange 55 comprising a flat wall 56, with one flat surface F56 extending in a plane substantially perpendicular to the axis of rotation A5, where said flat surface F56 engages with said flat surface F63 of said attachment tab 63 in order to provide the translational stop of the circular housing 52 relative to the plug 62 in a direction of the axis of rotation A5.

As can be seen from the sample implementation FIGS. 1 and 2, said surface F63 of the attachment tab 63 is located bearing against the surface F55 of the flat wall 56 of the flange 55, thus providing the translational stop of the manual lever 5 relative to the attachment part 6 following a direction along the axis of rotation A5.

Because of this there is no need to provide an additional means for providing the translational stop of the manual lever 5 relative to the attachment part 6 in the direction of the axis of rotation A5, since it is provided by the means of pivoting between said manual lever 5 and the attachment part 6.

Notably, in the case where two circular housings 52 laid-out in two flanges 55 each comprising a flat wall 56, with at least one flat surface F56 extending in a plane substantially perpendicular to the axis of rotation A5, and two plugs 62 arranged projecting from one flat surface F63 of one attachment tab 63, extending in a plane substantially perpendicular to the axis of rotation A5, and that said plugs 62 extend along a single axis A5 but with an opposite direction, as can be seen on the sample implementation from FIGS. 5a and 5b, said flat surfaces F63 also being oriented along an opposite direction, are provided, then the translational stop of the manual lever 5 relative to the attachment part 6 is provided in both directions along the axis of rotation A5.

There is therefore no need to provide additional means for providing the translational stop of the manual lever 5 relative to the attachment part 6 along the axis of rotation A5, since the means of pivoting integrally provide the attachment of the manual lever 5 onto the attachment part 6.

The assembly of the manual lever 5 to said attachment part 6 is therefore done quickly and simply, by coming simply to position the clipping parts of the manual lever 5 onto the clipping parts of the attachment part 6, and without additional operation, which also requires few actions by an operator performing such assembly.

According to an embodiment, said attachment tab 63 is received in an inner chamber 57 formed between said flat wall 56 of the flange, said first flat wall 56, and a second flat wall 58 parallel to the first flat wall 56 of the flange 55.

Advantageously, the distance D57 separating the two flat walls 56, 57 of the flange 55 can be slightly greater than the thickness E63 of the attachment tab 63 of the attachment part 6 in order to assure a nesting play between said attachment tab 63 and said inner chamber 57 allowing an easy insertion of said attachment tab 63 in said inner chamber 57.

The present disclosure serves to make the guiding of the flange 55 relative to the attachment tab 63 easier during assembly of the manual lever 5 to the attachment part 6, and therefore to accelerate and simplify said assembly.

The second flat wall 58 also serves to stiffen the flange 55 and therefore stiffen the pivot connection between the manual lever 5 and the attachment part 6.

According to an embodiment, said inner chamber 57 comprises a stop surface 59 engaging with a stop finger 64 laid out on said attachment tab 63, in order to stop rotation of the manual lever 5 around said axis of rotation relative to the attachment part 6, according to one rotation direction, when the manual lever 5 is in an end-of-range position relative to the attachment part 6.

In fact, as can be seen in the sample implementation from FIGS. 1 and 2, the manual lever 5 drives the displacement of the locking means 41 of the bolt 4. Just the same, this displacement must be done over a limited range for avoiding a disassembly of the locking means 41 from the bolt 4, in particular when said locking means 41 is made in the form of a latching plug passing through a plurality of latching openings laid out on the lower rail 2 and on the upper rail 3, since this would reduce the reliability of such a bolt 4 over time.

The engagement between said stop surface 59 and said stop finger 64 serves to implement an end-of-range stop between the manual lever 5 and the attachment part 6 without providing supplemental means for filling such a function, since the means of pivoting between the manual lever 5 and the attachment part 6 also fulfill this function.

Figure 3:
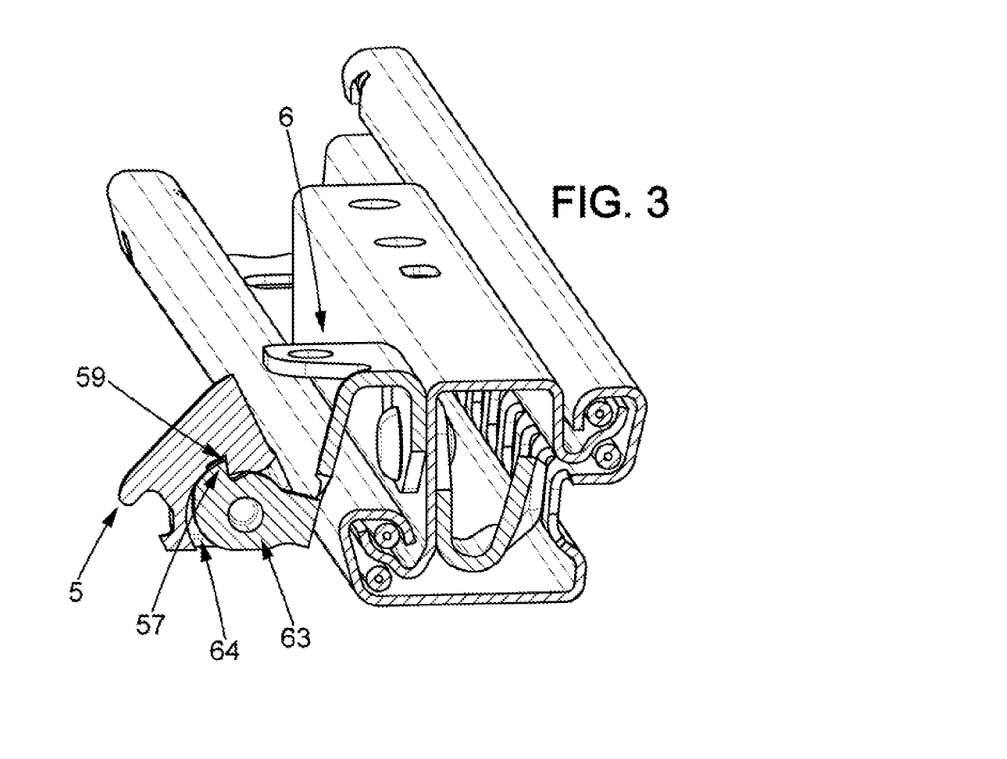
FIG. 3 is a section view along the line III-III of the track from FIG. 1.

As can be seen in the sample embodiment from FIG. 3, said stop surface 59 and said stop finger can be configured to provide the rotational stop of the manual lever 5 relative to the attachment part 6 along the direction of rotation driving the locking member 41 from the locked position thereof towards the unlocked position thereof, corresponding to a rotation in the counterclockwise direction of FIG. 2.

As can be seen in the sample implementation from FIGS. 2, 3 and 4a to 4c, said stop surface 59 can be a flat surface of said inner chamber 57, extending along a plane substantially perpendicular to the plane of the surface F56 of the flat wall 56 of the flange 55, positioned along the end of range position preferred for the rotation of the manual lever 5 relative to the attachment part 6.

In order to make the production of the flange 55 of the manual lever 5 easier, in particular when it is done by molding, an opening L59 can also be provided opening out towards the outside of the inner chamber 57, near the outer surface (across from said surface F56) of the flat wall 56, over the portion of the inner chamber 57 comprising said stop surface 59.

According to an embodiment, the attachment part 6 is made of metal, for example of S500MC.

In fact, the attachment part 6 is intended to be attached to the lower rail 2 or to the upper rail 3 of the track 1 and can therefore be brought to experience and carry significant forces, in particular shearing forces along the direction of extension of the axis of rotation A5, for example in case of vehicle accident. In fact, this attachment part can comprise at least one latching opening, acting as a circular guide the latching plug 41 passes through, and intended to provide guiding for said latching plug combined with the second guiding opening inside the rails 2, 3 of the track 1.

In this case, since metal deforms less well elastically than plastic, the at least one plug 62 of the second part 61 will be provided on said attachment part 6, because it does not need to deform elastically for the assembly by clipping of the manual lever 5 on the attachment part 6 where the elastic deformation occurs principally near the circular housing 52 of the first part 51.

According to an embodiment, said at least one plug 62 is made as a single unit with the attachment part 6.

The set of the elements of said attachment part 6, and in particular the attachment tabs 63, can also be laid out as a single unit with the attachment part 6 in order to make implementation thereof easier.

In the case where the attachment part 6 is made of metal, it can be shaped by various forging operations on a metal sheet.

According to an embodiment, said at least one circular housing 52 is plastic, for example a PA6.

Since said circular housing 52 has to deform elastically for the assembly by clipping of the manual lever 5 onto the attachment part 6, it may made of plastic.

According to an embodiment, the manual lever 5 is made entirely of plastic, where said at least one circular housing 52 is laid out as a single piece with the manual lever 5.

In fact, the manual lever 5 experiences and must withstand less significant forces than the rails 2, 3 of the track 1, and therefore than the attachment part 6, for example in case of a vehicle accident. Said manual lever 5 may be made from plastic instead of metal, which therefore reduces the unit cost thereof and also the cost of the track 1.

According to an embodiment, the manual lever 5 is made by injection molding.

Such a manufacturing method is particularly simple and economical to implement and that way the unit cost of such a track can be reduced.

The present disclosure also relates to a vehicle seat comprising at least one track 1 according to one of the embodiments previously described.

With such a track 1, the seat can be guided in translation relative to the chassis of the vehicle, in particular for adjusting the position of the seat relative to the chassis. Thus the lower rail 2 can be attached to the floor of the vehicle, whereas the upper rail 3 is attached to the seat, and in particular to the seat cushion of the seat.

The manual lever 5 can be actuated by a user of the seat to allow the movement of the seat relative to the floor of the vehicle, and thereby to adjust the position of said seat relative to the chassis of the vehicle.

Finally, the present disclosure relates to an assembly method for a track 1 according to one of the embodiments previously described, in which said manual lever 5 and said attachment part 6 are assembled by coming to clip the clipping means of the first part 51 and the second part 61 of the means of pivoting of the bolt 4.

As previously explained, such a method is simple and quick to implement and needs fewer actions to be done by an operator implementing it.

One illustrative comparative track comprises a lower rail and an upper rail, mounted sliding relative to the lower rail. The lower rail comprises a row of latching openings, in which the distal ends of the three latching plugs can be received, providing the immobilization in translation in the locked position along the longitudinal direction of the lower rail relative to the upper rail. Said latching plugs are constrained in said locking position and are inserted along the axial direction thereof into passages laid out in the upper rail and the unlocking is done by withdrawing said latching pads from said latching openings against the constraining force. The latching plugs are arranged obliquely according to the section of the track, from bottom to top, from the proximal end of the latching plug towards said distal end.

An inclined metal sheet, outside the track, is attached on the upper rail comprising three guiding openings through which the latching plugs are intended to pass. Another metal sheet, inside the rails of the track comprises three guiding openings through which the latching plugs are intended to pass. For each plug, the guiding opening of the outer metal sheet and the guiding opening of the inner metal sheet provide guiding for the latching plug between two positions offset along the axis of the plug.

Near the free ends of said inclined, outer metal sheet extend two tabs, in which an axis is arranged and on which an unlocking metal sheet with two branches is arranged, where the metal sheet is mounted pivoting relative to said inclined metal sheet on said axis.

One of the branches of said unlocking metal sheet is intended to receive one end of the latching plugs in order to provide for their movement out of the latching openings, during rotation around said axis. Said unlocking metal sheet constitutes the lever for the track allowing the movement from the locked position to the unlocked position.

In such a track, the unlocking sheet is made of metal, in order to maximize the robustness of said track, however, the assembly of said unlocking metal sheet on said track proves particularly long and challenging, in that the mounting of the axis on the tabs of said inclined metal sheet and means for translational stopping of the axis relative to said inclined metal sheet has to be provided in addition to the mounting of said locking metal sheet. This also represents a significant unit cost.

The invention claimed is:

1. A track for a vehicle seat comprising:
   a lower rail;
   an upper rail, mounted sliding relative to the lower rail in a longitudinal direction;
   a bolt comprising a locking member mobile between:
   a locked position, in which the bolt immobilizes the lower rail and the upper rail relative to each other;
   an unlocked position, in which the bolt allows the lower rail and the upper rail to slide relative to each other;
   wherein the bolt is configured to pass from the locked position thereof to the unlocked position thereof by means of a manual control lever, mounted pivoting around an axis of rotation on an attachment part, secured to the upper rail or the lower rail;
   wherein the bolt has means of pivoting between said manual control lever and the attachment part comprising a first part and a second part belonging respectively to the manual control lever and the attachment part, or vice versa, hinged one relative to the other around said axis of rotation,
   wherein each one of the first part and the second part comprise means for clipping, allowing an assembly of the manual control lever and the attachment part by elastic deformation of the clipping means of the first part or the second part,
   wherein the clipping means comprise respectively two plugs, being arranged symmetrically about a plane of symmetry of the attachment part orthogonal to the axis of rotation, each one with a circular cross-section, and each one having a first axis, and two circular housings being arranged symmetrically about a plane of symmetry of the manual lever orthogonal to the axis of rotation, each one having a second axis, belonging respectively to the first part and to the second part, wherein the first axis of the circular cross-sections of the plugs and the second axis of the circular housings are oriented along the axis of rotation, wherein each one of said plugs are respectively received pivoting in one of the circular housings to form said axis of rotation, each one of the circular housings comprising a discontinuous circular wall with an insertion groove present with a separation of size less than the diameter of the plugs, and wherein the assembly by clipping of the two parts results from insertion of each one of the plugs respectively through one of said insertion grooves during which the separation increases by elastic deformation of said circular housings and then returns to the initial value thereof to provide the hold of each one of the plugs respectively in the circular walls of one of the circular housings wherein each one of said plugs are respectively arranged projecting in an opposite direction from a first flat surface of one of two attachment tabs, each one extending in a plane substantially perpendicular to the axis of rotation; and each one of the circular housings is respectively arranged in one of two flanges, each one comprising a first flat wall, each one with a second flat surface extending in a plane substantially perpendicular to the axis of rotation in an opposite direction, wherein each one of said second flat surfaces is respectively located bearing against the first flat surface of one of the two said attachment tabs in order to provide a translational stop of the manual control lever relative to the attachment part in a direction along the axis of rotation, wherein each one of said attachment tabs is received in a respective inner chamber, each one respectively formed between each first flat wall of each flange, and a second flat wall parallel to the first flat wall of each flanges, wherein each one of said plugs is made as a single unit with the attachment part.

2. The track of claim 1, wherein said inner chamber comprises a stop surface engaging with a stop finger formed on said attachment tab, in order to stop rotation of the manual control lever around said axis of rotation relative to the attachment part, according to one rotation direction, when the manual control lever is in an end-of-range position relative to the attachment part.

3. The track of claim 1, wherein said circular housings are made of plastic.

4. The track of claim 3, wherein the manual control lever is made entirely of plastic, wherein both circular housings are formed as a single piece with the manual control lever.

5. The track of claim 4, wherein the manual control lever is made by injection molding.

6. The track of claim 5, wherein the attachment part is made of metal.

7. A vehicle seat comprising at least one track according claim 1.

8. An assembly method for a track according to claim 1, wherein said manual control lever and said attachment part are assembled by the clipping means of the first part and the second part of the means of pivoting of the bolt.

* * * * *